UNITED STATES PATENT OFFICE.

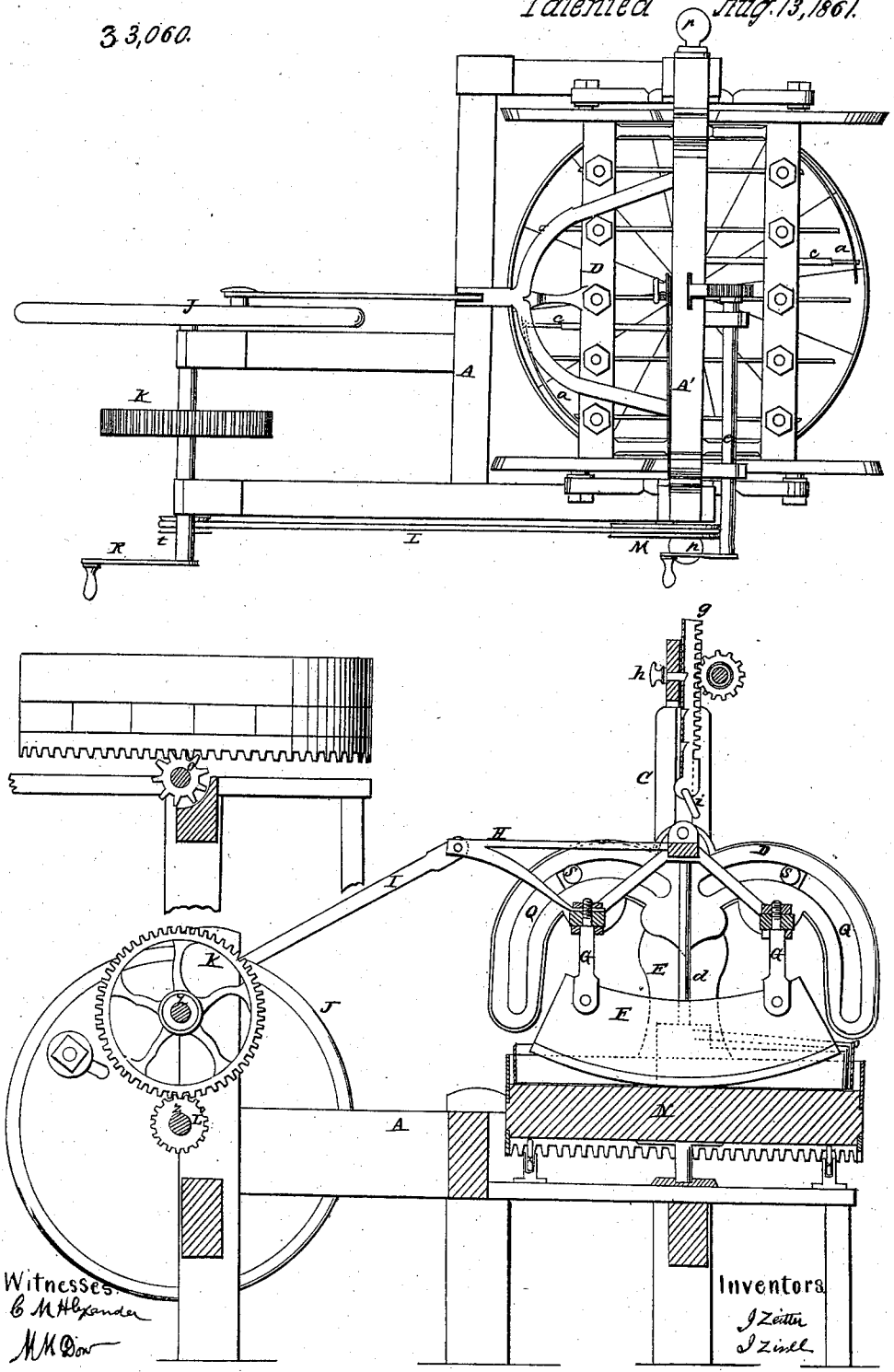

JOHN ZEITLER AND JOSEPH ZINTL, OF DAYTON, OHIO.

MEAT-CUTTER.

Specification of Letters Patent No. 33,060, dated August 13, 1861.

*To all whom it may concern:*

Be it known that we, JOHN ZEITLER and JOSEPH ZINTL, of Dayton, Montgomery county, Ohio, have invented certain new and useful Improvements in Meat-Cutters; and we do hereby declare that the following is a full, clear, and exact description of the same, reference being had to the accompanying drawings and to the letters of reference marked thereon.

In the annexed drawings making part of this specification A represents the frame upon which the machine is erected, and which is constructed in a strong and substantial manner.

C C are two uprights on each side of the frame A, which are provided with vertical slots; and which are connected at top by means of a cross tie A'.

N represents a revolving meat chopper block which is secured upon the frame A. This block is provided with gear teeth upon its under rim, which gear into a pinion $o$, by means of which it is revolved.

Two plates (E) with arms provided with pins $s$, $s$, are secured to the uprights C, C, by means of set screws $p$, $p$, which pass through and play in the openings in the uprights.

D represents a rocking frame made in the form shown and provided with curved slots Q, Q, in which the pins $s$, $s$, fit. This frame may be rocked upon the pins—said pins serving as guides and supports to direct and hold the frame in its proper position.

(F,) represents the knives which are secured in the frame D, and which are held and attached by means of the arms G, G, as shown.

Secured to the upper rim of the meat block are two springs $a$, $a$, which are connected to the frame D, by means of connecting rods $c$, $c$, and arms $d$, $d$. When the frame rocks the ends of these springs to which the rods are attached play to and from the center of the block thus feeding the meat to the center of said block and properly to the knives. Attached to the cross tie A' are loops which hold a shaft $e$, with a pinion secured to one end as seen. This pinion plays into a rack bar—raising and lowering said bar when necessary. A stop $h$ catches into the rack bar and holds it in any desired position. A hook is secured to the lower end of the bar $g$, which catches into the frame D, and serves to elevate and hold it when desired.

Two shafts $z$, $z$, lie across one end of frame A. To one of these is secured a driving wheel J, a pinion L', and a pulley $t$. To the other is secured a gear wheel K, and a crank. By turning the crank mentioned the wheel K, imparts motion to the frame D, through the pitman I, and connecting bar H. The wheel K, also imparts motion through the pulley $t$, band L, and pulley M, on the shaft of pinion $o$, to the revolving meat block. The meat to be cut is placed upon the block N, and then the frame D is adjusted by means of the set screws $p$, $p$, so that the knives will properly cut the meat. The crank R. is then turned and motion is communicated to the several parts as has just been described. The rocking frame oscillates as the crank turns and the knives cut the meat while at the same time the springs $a$, $a$, are constantly employed in keeping the meat well under the knives.

Having thus fully described our invention what we claim as new and desire to secure by Letters Patent is—

1. The employment of the rocking frame D provided with knives, constructed and used as and for the purpose herein set forth.

2. The employment of the plates E, E', which are adjustable upon the uprights C, C, when constructed as set forth and used in connection with the rocking frame as and for the purpose specified.

3. The arrangement of the springs $a$, $a$, with the connecting rods $c$, $c$, and arms $d$, $d$, upon the frame D, as and for the purpose set forth.

4. The combination of the revolving table with the rocking frame and its accompanying mechanism substantially as and for the purpose set forth.

JOHN ZEITLER.
JOSEPH ZINTL.

Witnesses:
JAMES TURNER,
JON KENNEY,
MIKEL WIESMAN.